United States Patent Office 2,921,919
Patented Jan. 19, 1960

2,921,919

RUBBERIZED MINERAL-TAR COMPOSITION AND PROCESS OF MAKING SAME

Herbert A. Endres, Silver Lake, Ohio, and Walter F. Winters, Winnetka, Ill., assignors, by mesne assignments, to The Goodyear Tire & Rubber Company, Akron, Ohio, a corporation of Ohio No Drawing. Application November 16, 1955
Serial No. 547,319

5 Claims. (Cl. 260—28.5)

This invention relates to a tar composition having rubber-like properties and is more particularly directed to a material comprising a rubberized mineral carrier combined with tar and to a process for preparing the composition as well as uses thereof.

In the building of roads, asphalt is much used as a surfacing material but surfaces so prepared are not suitable for installations where solvents are constantly being spilled upon the surface. This difficulty has been brought to the fore by the necessity of providing suitable runways for jet aircraft, the jet fuel being subject to frequent spillage and being of a high boiling character and thus slow to evaporate. Thus, jet runways are subject to more or less constant attack by the solvent power of the jet fuels spilled upon them. For such uses, therefore, asphalt pavings are not suitable since the asphalt is soluble in the jet fuel and the runway quickly deteriorates.

It has now been discovered that tar, when suitably treated, provides an excellent surfacing material for jet runways. This is true even though tars are normally much softer than asphalts. The runway surface is prepared by adding to a tar a small amount of rubber, the tar thus treated becoming stabilized against changes in its physical properties due to temperature variations but, most importantly, offering great resistance to solvent attack by the jet fuels. The rubber must be incorporated in powder form, as will be set forth hereinafter, and best results are obtained if the rubber is of an oil-resistant type, specifically, a butadiene-acrylonitrile copolymer. In order to obtain readily dispersible unvulcanized rubber in powder form a mineral carrier is co-precipitated with latex rubber. This invention is concerned with a process for incorporating rubber in tar rapidly and in such a manner as to obtain the maximum benefits from the rubber.

It is, therefore, an object of this invention to provide a rubberized tar composition. It is another object of this invention to provide a composition of rubber and mineral filler which can be quickly incorporated into tars. It is a further object of this invention to provide a rubberized barytes powder which can be rapidly dispersed in hot tars. It is still another object of this invention to provide a rubberized barytes powder which can be rapidly dispersed in a mixture of hot tars and aggregates to form a surfacing composition. Other objects will be apparent as the description proceeds.

In the practice of this invention a rubber powder is first prepared by mixing a water suspension of a mineral filler or carrier with a rubber latex and then co-precipitating by means of a coagulant. The coagulated compound is filtered from the slurry, dried and pulverized. The product is inexpensive, easy to handle because it is free-flowing, and readily dispersible in tars.

A preferred inert carrier which is especially adapted to the practice of this invention is a finely divided pulverulent barytes mineral such that all particles will pass a 200-mesh standard sieve and such that substantially all particles pass a 325-mesh standard sieve. A particularly suitable mineral is the mineral content of the effluent from barite ore refining wherein 90% of the barytes mineral particles are finer than 10 microns in diameter and 50% of them have a particle size of less than 5 microns. This barytes mineral composition may be composed of from about 50% to about 90% by weight of barium sulphate together with natural impurities such as quartz and compounds of silica. This composition is particularly adapted to the practice of this invention because it has the inherent properties of high specific gravity coupled with relative softness and it has an affinity for tars which helps carry the rubber component rapidly into complete amalgamation with the tar. Although barytes is preferred in the practice of this invention, other non-fully equivalent inert minerals display many of the advantages imparted by barytes and may be used in the practice of the invention. For example, finely ground minerals such as perlite, fly-ash, ground quartz, clay, diatomaceous earth, soapstone, bentonite, ground limestone, and pulverulent carbon, ranging in size from 1 to 40 microns, can be used as carriers.

The barytes mineral, in an amount of about 5 to 30 parts by weight, can be slurried with about 95 to 70 parts by weight of water. The pH of the slurry is adjusted to about 8.0 to 9.5 to prevent premature coagulation of the rubber. To this slurry about 2 to 12 parts by weight of 30% nitrile rubber latex is added or an equivalent amount of rubber solids from various other oil-resistant latices of various rubber concentrations may be used. The slurry of rubber latex and carrier is agitated until a homogeneous mixture is obtained.

While it has been found that many types of unvulcanized latex rubber may be used in the practice of this invention, such as natural rubber latices, polyisobutylene latices, polychloroprene latices, butadiene-styrene latices, i.e., GR–S latices, polybutadiene latices, acrylonitrile latices, i.e., butadiene-acrylonitrile latices, isoprene-acrylonitrile latices or ethyl acrylate-acrylonitrile latices, polyisoprene latices and polysulfide latices, it is preferred to use butadiene-acrylonitrile latices, especially those wherein the ratio of butadiene and acrylonitrile ranges from about 50 to 85% of butadiene by weight to 15 to 50% of acrylonitrile by weight. These nitrile rubbers are preferred since, with these, maximum resistance to solvent attack is achieved.

After the latex-filler slurry has been thoroughly mixed, a coagulant is added to precipitate the solids from the mixture. Any of the customary coagulants can be used. Representative coagulants are aluminum sulphate, sodium chloride, barium chloride, calcium chloride, magnesium sulphate, hydrochloric acid and sulphuric acid.

Although the particle size of the composition can be varied within limits it is preferred to coagulate the rubber and mineral as particles of about 50 to 200 microns in diameter. The rubberized mineral particles will normally pass through a 60-mesh standard screen. The resulting rubber-filler particles can be subsequently de-watered, dried and pulverized to break up aggregates to form a fine free-flowing powder for ready use in tar applications.

The final rubber-mineral filler product may contain from about 10 to 40 percent by weight of rubber and from about 90 to 60 percent by weight of filler. In the practice of this invention we have found that a dry pulverized composition containing 25.0% by weight of nitrile rubber and 75.0% by weight of filler gives very satisfactory results. At least 85% of this composition should pass through an 80-mesh standard sieve and about 55% should pass through a 200-mesh standard sieve.

The rubber-mineral carrier composition remains remarkably free-flowing and storage-stable. This is believed to be due to the manner of distribution of the barytes and rubber in the powder, the dry composite apparently consisting of groups of barytes particles having interlaced therewith and spread over and interlocked with their irregular surface areas thin films of unvulcanized rubber in a discontinuous phase, particles of barytes protruding through the rubber films to act as non-tacky contacting surfaces. This composite rubber-barytes particle material is and remains in the form of a loose, free-flowing powder which can be rapidly dispersed in tars.

The dry rubber-mineral filler composition can be mixed with tar in an amount large enough to add sufficient rubber to impart satisfactory stabilization but small enough to keep from deleteriously affecting the properties of the tar by increasing the viscosity too much. In order to provide satisfactory results, the rubber content should be at least 0.5% by weight and not over 15.0% by weight, based on the weight of tar, 1.0% to 5.0% being preferred. The amount of dry rubber-mineral filler added will obviously vary with the composition of the filler. When the filler is comprised of the preferred 25 to 30% by weight of rubber to 75 to 70% by weight of mineral carrier, about 5% by weight to about 40% by weight of dry rubber-mineral carrier filler can be mixed with about 95% by weight to about 60% by weight of tar to impart the desired characteristics without deleteriously affecting the tar by increasing the viscosity too much.

The powdered rubberized mineral can be quickly and conveniently hot-mixed with tar and aggregate in an ordinary pug mill which is conventionally used in paving operations to form a paving mixture. Also, if desired, the rubberized carrier can be premixed with one or more of the herein-described tars and thereafter combined with ordinary aggregate to form a paving mixture.

The tars and pitches, which are useful in the practice of this invention are viscous to hard compositions which may be referred to as pitchy tars, resulting from the destructive distillation of carbonaceous materials, and characterized by having a water-insoluble residue upon sulfonation of from 0% to 40% by original weight of the carbon disulfide-soluble portion of the tar, in accordance with the test set forth on pages 1213-1214 of the book by Herbert Abraham entitled "Asphalts and Allied Substances," Fifth Edition, Van Nostrand, New York, 1945. In accordance with this test, three grams of the carbon disulfide-soluble portion of the substance are mixed with 6 cc. of concentrated sulfuric acid in a test tube and agitated for a period of 45 minutes with the test tube surrounded with boiling water. The contents of the test tube are then poured into 500 cc. of cold water, and after a period of two hours standing, the precipitate, if any, is decanted, filtered, washed, dried, and weighed.

The tars and pitches of this invention are further characterized by giving a positive diazo reaction when tested according to the diazo reaction described in detail on pages 1234 and 1235 of the Abraham reference, cited above. Reference is made to the Abraham work cited for further details.

Depending on the source, the various tars are referred to as oil gas tars, water gas tars, pine tars, hardwood tars, peat tars, lignite tars, shale tars, coal tars, and bone tars. The various coal tars, which are preferred in the practice of this invention, are further referred to as coke oven tars, vertical retort tars, horizontal retort tars, and low temperature tars.

The useful tars for the practice of this invention are tars which give a 300° C distillation residue having a softening point within the range of 25° C. to 70° C., particularly tars having a residue softening point within the range of 40° C. to 70° C. Preferred tars are pitchy coal tars identified as RT tars by the U.S. Government Federal Standard Stock Catalog issued by the Bureau of Public Roads. These tars, which have been given numerical identifications of RT-1 to RT-12, RTCB-5 and RTCB-6, are further defined in Highway Materials, 8th ed., Part 1, pages 31 and 32, published by the American Association of State Highway Officials, 1955. The RT-7 to RT-12 tars are particularly useful in practicing this invention, RT-12 being preferred. This coal tar has a specific gravity at 25° C. of 1.16, 75% by weight of total bitumen, less than 10% of distillable content at 270° C., less than 20% distillable content at 300° C., and a residue softening point of 40° C. to 70° C.

In the practice of this invention it is essential that the rubberized mineral pigment be substantially anhydrous and that the pitchy tar also be substantially free of moisture. If the rubberized carrier contains moisture the desirable factors of storage stability, free flowability and rapid dispersion are adversely affected. Any substantial amount of moisture must be evaporated during the mixing cycle before the composition can be laid on the base to be surfaced. Because the mixing time is as short as one-half to one and one-half minutes, no time can be allowed for evaporation of moisture. Even if the mixing cycle would permit evaporation, moisture deleteriously affects the rapid dispersion which is essential in obtaining the complete amalgamation which is necessary if the small amount of rubber is to display the maximum effectiveness. Thus, the rubberized pigments and the pitchy tars must both be substantially anhydrous.

The invention is more clearly understood when described in connection with a particular preferred tar, RT-12 coal tar, which has been rubberized with a substantially anhydrous rubber-mineral carrier filler, although it is to be understood that the invention is not limited to a particular tar. When a powdered mixture containing 30% nitrile rubber and 70% barytes was added to RT-12 coal tar in the proportion of 3% rubber, based on the weight of the tar, the softening point of the tar was raised from approximately 95° F. (35° C.) to 115° F. (36.1° C.), Brookfield viscosities were raised from 600 at 200° F. (93.3° C.) to 2,000 at 200° F. (93.3° C.), penetrations at 77° F. (25° C.) were lowered from a very soft 250 which was difficult to measure down to about 150. The tar-rubber materials had improved high temperature stability and increased low temperature flexibility. In addition, rubberizing the tar reduced oxidation and cracking as compared to the ordinary tar aggregate hot mixes. It was further noted that the tar became more dense and thus provided a more impermeable binder. This composition was used in a standard test developed by the Corps of Engineers whereby test panels were constructed and jet fuel was spilled onto the surface at four-hour intervals for a period of six weeks. The rubberized RT-12 was far more resistant to penetration by the fuels than untreated RT-12 tar. The rubberized RT-12 coal tar was subjected to a further test by being immersed in an aliphatic jet fuel. After 18 hours immersion at 100° F. (37.7° C.) the weight had changed only 0.71% and the volume had changed only 0.44%. Thus, the addition of rubber in the form of a free-flowing rubber-mineral powder has been shown to greatly improve the properties of coal tar.

In the preferred practice of this invention a dry mineral aggregate is heated to a temperature between 200-300° F. (93.3-149° C.) in a pug mill and thereafter one or more of the herein-defined tars are mixed with the heated aggregate. To the mixing chamber containing the aggregate and tar, the rubberized carrier is added so that a complete and uniform blending is effected. The mineral aggregate is usually present in the proportion of about 85 to 95 percent by weight of the entire mixture and the rubberized tar in the proportion of about 5 to 15 percent. Thus, the rubber component of the paving mixture may be as low as 0.15% and still be effective in producing the desired result and may be present in a proportion as large as 0.5 to 5.0 percent. The relationship of rubber to total paving mixture will obviously depend on the contemplated use and type of rubber. The complete mixing cycle can usually be completed in from ½ to 1½ minutes, the amount of time customarily available for on-the-job preparation of commercial paving mixtures. Thus, a novel feature of this invention is that it enables conversion of a tarry paving composition into a rubberized tarry paving composition in a short period of time and with the same equipment as used in the production of regular hot type paving mixtures.

It has not been completely established why or how the small amount of rubber thus added so markedly changes the properties of the tars. However, from a rheological standpoint, rubber must be highly dispersed in tars in order to display the maximum effectiveness. It is believed that a highly dispersible rubber composition such as the free-flowing powder of this invention, proceeds to ultimate dispersion in tars in three stages:

(1) Rapid dispersion of the discrete rubber particle into the mass of the tar;

(2) The partial or complete breakdown of the rubber particle into molecular or near molecular size, accompanied by effective "solution" in the tar; and (3) A structural rearrangement occurring between the tar micelle and the rubber molecule to form essentially a new material.

If a rubber exists merely as sticky particles it is not capable of passing through phases 1 and 2, and does not impart the desired changes to the tar. Ordinary crumb rubbers do not rapidly disperse and do not go through phases 1 and 2, whereas the products of this invention become readily dispersed and exhibit the maximum effect in stabilizing the tars against deterioration from aliphatic fuels as well as against flow in hot weather and cracking in cold weather because of complete and rapid dispersion. Migration of the rubber in the tar probably continues for an appreciable period after the tar compositions are cast. Therefore it is highly important that the rubber particles be as completely dispersed as possible in order to provide the maximum number of rubber particles as centers of migration around which the tars are modified by the rubber migrating thereinto.

The compositions of this invention find greatest utility in surfacing applications where fuels, particularly aliphatic fuels, are normally spilled. For example, jet aircraft operation results in considerable spillage of fuels before and during takeoffs. Since this fuel is high-boiling, it does not evaporate quickly and remains on the runway to attack and deteriorate the surface thereof by dissolving constitutents of such surfaces. Thus the invention is useful in the surfacing of jet airstrips.

Although the invention has been described with respect to jet airship surfacing compositions, it is to be understood that it can be used for any purpose where tars are normally used. Representative examples are service station aprons, seal coats for other materials, joint fillers, parking areas, streets, sidewalks, pit linings, facings for dikes around oil storage tanks, floorings (particularly industrial floors) revetments and jetties.

In the practice of this invention, the rubberized tar-aggregate hot mix is normally compacted to a thickness of about 1½ to 2 inches on top of some form of base.

The preferred base composition is a course of several inches of heavy aggregate topped by a customary asphalt surface. The rubberized tar-hot mix will bond with the asphalt so that the tar will not strip from the asphalt. All of the asphalt can be replaced by the rubberized tar mix of this invention if desired. Also, the rubberized tar mixtures of this invention can be laid as protective surfaces on existing pavements of various types such as bricks, concrete, asphalt and combinations thereof.

While certain representative embodiments and details have been shown for the purpose of illustrating the invention, it will be apparent to those skilled in this art that various changes and modifications may be made therein without departing from the spirit or scope of the invention.

We claim:

1. A method of producing a substantially anhydrous rubberized mineral-tar composition suitable for use as a material for surfacing areas subjected to solvent action of liquid hydrocarbons which comprises thoroughly intermixing a latex of an unvulcanized diene polymer rubber and a mineral filler, all particles of said filler being of a size to pass a 200-mesh standard sieve, in such proportions that the solids content of the mixture consists essentially of 10 to 40 percent by weight of rubber and from 90 to 60 percent by weight of mineral filler, coagulating the rubber in said mixture to form rubberized mineral particles, dewatering, drying and pulverizing the resulting rubberized mineral particles to form a substantially anhydrous, storage-stable, free-flowing powder capable of passing a 60-mesh standard screen, mixing 5% to 40% by weight of said powder with a tar having a 300° C. distillation residue softening point of between about 25° and 75° C. and in such proportion that the amount of rubber in the resulting rubberized mineral-tar composition is between about 1% and 5% by weight of said composition, and continuing said mixing until a homogeneous surfacing composition is formed.

2. The process according to claim 1 wherein the diene polymer rubber is a nitrile rubber comprised of from 50% to 85% by weight of butadiene and from 15% to 50% by weight of acrylonitrile.

3. The process according to claim 1 wherein the mineral pigment is a mineral barytes.

4. The process according to claim 1 wherein the mineral pigment is a clay.

5. A substantially anhydrous rubberized mineral-tar surfacing composition prepared by the method as claimed in claim 1.

References Cited in the file of this patent

UNITED STATES PATENTS

| | | |
|---|---|---|
| 2,536,611 | Miller | Jan. 2, 1951 |
| 2,700,655 | Endres et al. | Jan. 25, 1955 |
| 2,807,596 | Flickinger | Sept. 24, 1957 |

FOREIGN PATENTS

| | | |
|---|---|---|
| 638,507 | Great Britain | June 7, 1950 |